United States Patent
Badhani et al.

(10) Patent No.: US 9,584,422 B2
(45) Date of Patent: *Feb. 28, 2017

(54) METHODS AND APPARATUSES FOR AUTOMATING RETURN TRAFFIC REDIRECTION TO A SERVICE APPLIANCE BY INJECTING TRAFFIC INTERCEPTION/REDIRECTION RULES INTO NETWORK NODES

(71) Applicant: Cisco Technology, Inc., San Jose, CA (US)

(72) Inventors: Devendra Mohan Badhani, San Jose, CA (US); Chao Feng, San Jose, CA (US); Samar Sharma, San Jose, CA (US); Kalyan Venkataramana, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 14/486,313

(22) Filed: Sep. 15, 2014

(65) Prior Publication Data

US 2015/0003252 A1 Jan. 1, 2015

Related U.S. Application Data

(63) Continuation of application No. 13/557,522, filed on Jul. 25, 2012, now Pat. No. 8,837,486.

(51) Int. Cl.
*G01R 31/08* (2006.01)
*H04L 12/803* (2013.01)
*H04L 12/725* (2013.01)
*H04L 12/801* (2013.01)

(52) U.S. Cl.
CPC .......... *H04L 47/125* (2013.01); *H04L 45/30* (2013.01); *H04L 47/18* (2013.01)

(58) Field of Classification Search
None
See application file for complete search history.

(56) References Cited

U.S. PATENT DOCUMENTS

| | | | |
|---|---|---|---|
| 5,289,462 A | 2/1994 | Ahmadi et al. | |
| 6,650,641 B1 * | 11/2003 | Albert | H04L 29/12009 370/392 |
| 6,829,219 B1 | 12/2004 | Honda et al. | |
| 6,836,462 B1 | 12/2004 | Albert et al. | |
| 6,856,991 B1 | 2/2005 | Srivastava | |
| 7,031,314 B2 | 4/2006 | Craig et al. | |
| 7,315,541 B1 | 1/2008 | Housel et al. | |

(Continued)

*Primary Examiner* — Duc C Ho
(74) *Attorney, Agent, or Firm* — Meunier Carlin & Curfman LLC

(57) ABSTRACT

Methods and apparatuses for automating return traffic redirection to a service appliance by injecting forwarding policies in a packet-forwarding element are disclosed herein. An example method for automating return traffic redirection can include: establishing a communication channel between a service appliance and a packet-forwarding element; and transmitting an out-of-band message over the communication channel to the packet-forwarding element. The message can include a forwarding policy that requests the packet-forwarding element to forward predetermined packets to the service appliance.

17 Claims, 6 Drawing Sheets

Establishing a communication channel between a service appliance and a packet-forwarding element 202

Transmitting an out-of-band message comprising a forwarding policy over the communication channel 204

(56) References Cited

U.S. PATENT DOCUMENTS

| | | |
|---|---|---|
| 7,539,175 B2 | 5/2009 | White et al. |
| 7,761,596 B2 | 7/2010 | Bhargava et al. |
| 7,792,113 B1 | 9/2010 | Foschiano et al. |
| 7,869,366 B1 | 1/2011 | Muppala et al. |
| 8,107,457 B2 | 1/2012 | White et al. |
| 8,295,284 B1 | 10/2012 | Singh et al. |
| 2002/0141393 A1 | 10/2002 | Eriksson et al. |
| 2003/0053448 A1 | 3/2003 | Craig et al. |
| 2003/0067922 A1 | 4/2003 | Yoshitani |
| 2004/0098511 A1 | 5/2004 | Lin et al. |
| 2006/0193295 A1 | 8/2006 | White et al. |
| 2006/0233155 A1 | 10/2006 | Srivastava |
| 2006/0291319 A1* | 12/2006 | Pesavento ............... G11O 5/145 365/226 |
| 2007/0055789 A1 | 3/2007 | Claise et al. |
| 2008/0005293 A1 | 1/2008 | Bhargava et al. |
| 2009/0049189 A1 | 2/2009 | Zhu et al. |
| 2009/0168701 A1 | 7/2009 | White et al. |
| 2009/0193428 A1 | 7/2009 | Dalberg et al. |
| 2009/0310610 A1 | 12/2009 | Sandstrom |
| 2012/0027015 A1 | 2/2012 | Carney et al. |
| 2012/0163180 A1 | 6/2012 | Goel |
| 2013/0272305 A1* | 10/2013 | Lefebvre ................. H04L 47/24 370/392 |

\* cited by examiner

METHODS AND APPARATUSES FOR AUTOMATING RETURN TRAFFIC REDIRECTION TO A SERVICE APPLIANCE BY INJECTING TRAFFIC INTERCEPTION/REDIRECTION RULES INTO NETWORK NODES

CROSS REFERENCE TO RELATED APPLICATION

This application is a continuation of U.S. application Ser. No. 13/557,522, filed Jul. 25, 2012, entitled "METHODS AND APPARATUSES FOR AUTOMATING RETURN TRAFFIC REDIRECTION TO A SERVICE APPLIANCE BY INJECTING TRAFFIC INTERCEPTION/REDIRECTION RULES INTO NETWORK NODES," which is incorporated herein by referenced in its entirety.

BACKGROUND

Network services are often inserted into a network. The network services may be services not included in the standard IP protocol. For example, the network services may include, but are not limited to, load balancing or application delivery services. The network services may be performed by one or more service appliances, which may be server blades integrated into network elements (e.g., switches, routers, etc.) or external appliances. The provision of network services typically necessitates manual configuration of network elements and network nodes (e.g., servers).

For example, when providing load balancing or application delivery services, a client device sends a request (e.g., one or more packets) that is intercepted by a service application running on one or more of the service appliances. The service application is configured to select a server among a group of servers to fulfill the request and to transmit the request to the selected server. To ensure that return packets (e.g., packets flowing from the selected server to the client device) are transmitted via the service application, one of the following steps is taken: (1) routing/redirection rules are setup on each of the network elements, (2) the service appliance is configured to perform source network address translation (NAT), or (3) the service appliance is setup as a gateway on each of the servers.

The existing solutions, however, have several drawbacks. For example, routing/redirection rules are typically manually configured in the network elements. Manually configuring routing/redirection rules can be a cumbersome, time-intensive operation, particularly in complex network environments where thousands servers (e.g., 16,000, for example) can be connected to each network element. Additionally, changes in state, availability and mobility of the servers and virtual IP addresses often require configuration updates in the network elements and/or the servers. Further, source NAT is an unacceptable deployment in network environments where the client's IP address is required to be known to and/or recorded by the servers (e.g., financial services networks).

SUMMARY

Methods and apparatuses for automating return traffic redirection to a service appliance by injecting forwarding policies in a packet-forwarding element are disclosed herein. An example method for automating return traffic redirection can include: establishing a communication channel between a service appliance and a packet-forwarding element; and transmitting an out-of-band message over the communication channel to the packet-forwarding element. The method steps above can be performed by the service appliance, for example. Additionally, the message can include a forwarding policy that requests the packet-forwarding element to forward predetermined packets to the service appliance.

Optionally, the message can be a policy-based routing (PBR) rule. For example, the PBR rule can include one or more criteria and corresponding forwarding rules. Additionally, the one or more criteria and corresponding forwarding rules can be based on source addresses of the predetermined packets.

In some implementations, the method can further include: receiving a packet having a source address of a client device and a destination address of the service appliance; performing a load balancing algorithm to select a server among one or more servers; changing the destination address of the packet to an address of the selected server; and forwarding the packet having the source address of the client device and the destination address of the selected server. These method steps can also be performed by the service appliance, for example.

In addition, the method can include: receiving a message from the packet-forwarding element indicating a change in network configuration; generating an updated forwarding policy that reflects the change in network configuration; and transmitting an updated out-of-band message over the communication channel to the packet-forwarding element. The message can also include the updated forwarding policy. These method steps can also be performed by the service appliance, for example.

Optionally, the communication channel can be a port channel. Alternatively or additionally, the service appliance can be configured to perform a load-balancing service.

Another example method for automating return traffic redirection can include: establishing a communication channel between a service appliance and a packet-forwarding element; and receiving an out-of-band message over the communication channel from the service appliance. The method steps discussed above can be performed by the packet-forwarding element, for example. Additionally, the message can include a forwarding policy that requests the packet-forwarding element to forward predetermined packets to the service appliance.

Optionally, the message can be a policy-based routing (PBR) rule. For example, the PBR rule can include one or more criteria and corresponding forwarding rules. Additionally, the one or more criteria and corresponding forwarding rules can be based on source addresses of the predetermined packets.

In some implementations, the method can include: receiving a return packet having a source address of a server and a destination address of a client device; determining whether to forward the return packet to the service appliance based on the forwarding policy; and transmitting or not transmitting the return packet to the service appliance based on the determination. These method steps can also be performed by the packet-forwarding element, for example.

Alternatively or additionally, the method can include: transmitting a message to the service appliance indicating a change in network configuration; and receiving an updated out-of-band message over the communication channel from the service appliance. These method steps can also be performed by the packet-forwarding element, for example. In addition, the message can include an updated forwarding policy that reflects the change in network configuration.

Optionally, the method can also include transmitting the out-of-band message to one or more adjacent packet-forwarding elements. This method step can be performed by the packet-forwarding element, for example.

Optionally, the communication channel can be a port channel.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a", "an", "the", include plural referents unless the context clearly dictates otherwise. The term "comprising" and variations thereof as used herein is used synonymously with the term "including" and variations thereof and are open, non-limiting terms. While implementations will be described for automating return traffic redirection to a service appliance performing load balancing by injecting forwarding policies in a packet-forwarding element, it will become evident to those skilled in the art that the implementations are not limited thereto, but are applicable for automating return traffic redirection to a service appliance performing any type of suitable network service such as services including but not limited to firewall, security and monitoring services.

Figure 1:
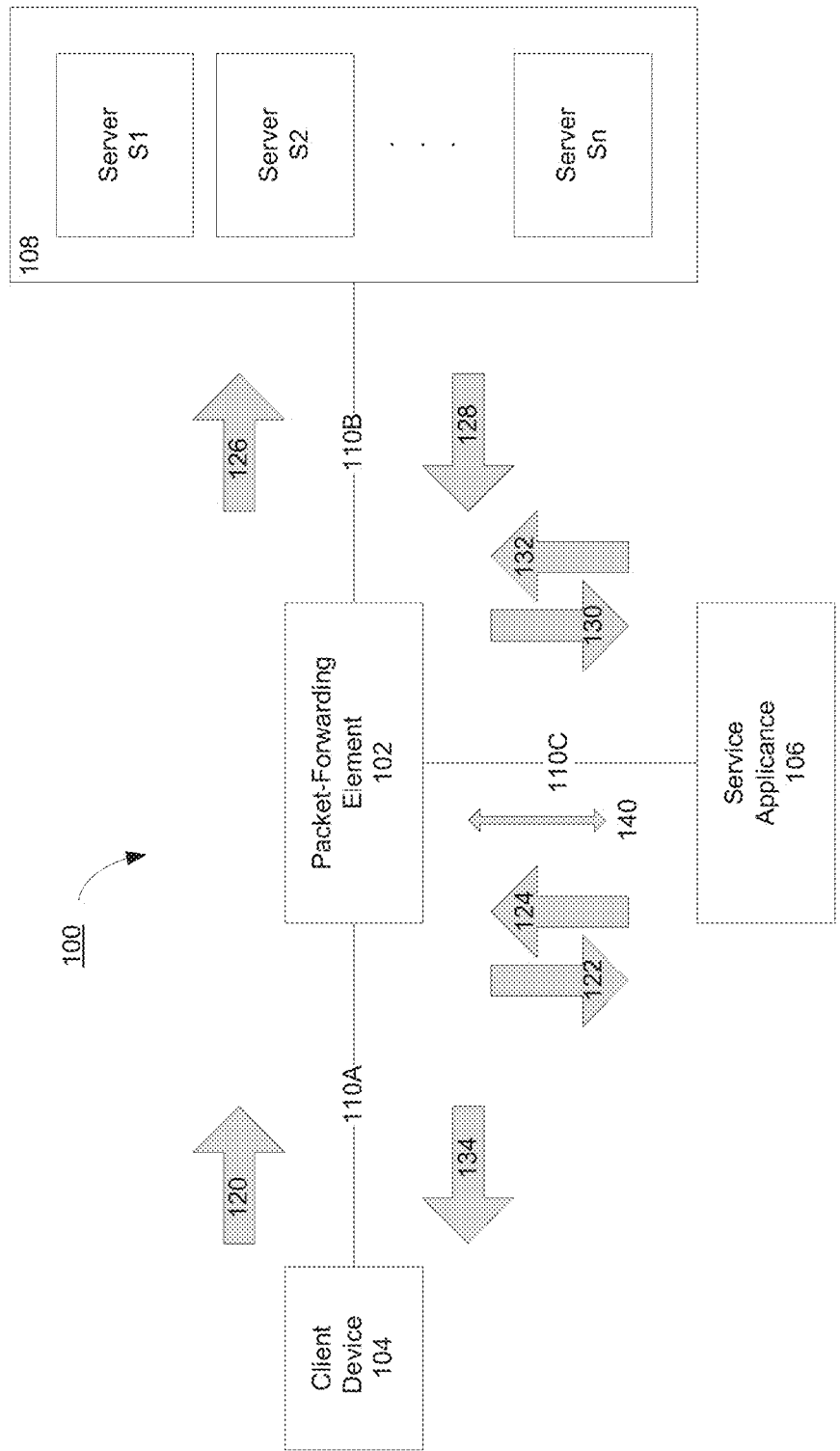
FIG. 1 is a block diagram illustrating a system for automating return traffic redirection.

Referring now to FIG. 1, a block diagram of a system 100 for automating return traffic redirection to a service appliance is shown. The system 100 includes a packet-forwarding element 102, a client device 104, a service appliance 106 and a server farm 108. The server farm 108 includes a plurality of servers $S_1, S_2 \ldots S_n$. The system 100 shown in FIG. 1 is only one example of a system 100 for automating return traffic redirection to a service appliance, and this disclosure contemplates systems having any suitable number of network elements (i.e., more or less network elements than shown in FIG. 1). The network elements shown in FIG. 1 can be connected to each other by one or more networks 110A, 110B, 110C. This disclosure contemplates that the networks 110A, 110B, 110C are any suitable communication network. The networks 110A, 110B, 110C can be similar to each other in one or more respects. Alternatively or additionally, the networks 110A, 110B, 110C can be different from each other in one or more respects. The networks can include a local area network (LAN), a wireless local area network (WLAN), a wide area network (WAN), a metropolitan area network (MAN), a virtual private network (VPN), etc., including portions or combinations of any of the above networks. The network elements shown in FIG. 1 can be coupled to the networks 110A, 110B, 110C through one or more communication links. This disclosure contemplates that the communication links are any suitable communication link. For example, a communication link may be implemented by any medium that facilitates data exchange between the network elements shown in FIG. 1 including, but not limited to, wired, wireless and optical links. Example communication links include, but are not limited to, a LAN, a WAN, a MAN, Ethernet, the Internet, or any other wired or wireless link such as WiFi, WiMax, 3G or 4G.

The packet-forwarding element 102 can include hardware or software or a combination of hardware and software that provide switching or routing functionality. For example, the packet-forwarding element 102 can be configured to receive packets, make packet-forwarding decisions and transmit packets based on the packet-forwarding decisions. The packet-forwarding element 102 can be one or more CISCO 7600 series routers of CISCO SYSTEMS, INC., SAN JOSE, CA, for example. Alternatively, the packet-forwarding element 102 can be one or more CISCO CATALYST 6500 series switches of CISCO SYSTEMS, INC., SAN JOSE, CA, for example. It should be understood that the packet-forwarding element 102 is not limited to the above examples and can be any type of packet-forwarding element.

The packet-forwarding element 102 can be configured to receive one or more packet flows. A packet flow is defined as packets sharing a unique combination of one or more packet-header fields including, but not limited to, source and destination IP address, source and destination port, source and destination MAC address, IP protocol and type of IP service. After receiving a packet, the packet-forwarding element 102 can be configured to perform one or more of the following functions: inspect one or more of the packet-header fields; identify/classify the packet as being associated with a packet flow based on the inspection; monitor one or more packet flows; update metrics associated with the one or more packet flows; make packet-forwarding decisions based on the inspection, identification, updated metrics, monitoring, etc. and transmit the packet based on the packet-forwarding decisions.

The service appliance 106 can include hardware or software or a combination of hardware and software for performing network services. As discussed herein, a network service includes one or more functions that operate on a packet or stream of packets and/or information determined from a packet or stream of packets. Optionally, a network service can be a service not included in the standard IP protocol. For example, the network services can include, but are not limited to, load balancing, firewall, security and monitoring services. The network services can be performed by one or more server blades integrated into the packet-forwarding element 102 or one or more external appliances.

As shown in FIG. 1, the service appliance 106 is an external appliance and is coupled to the packet-forwarding element 106 through the network 110B.

For example, the service appliance 106 can be configured to perform a load balancing service. The service appliance 106 can be the Application Control Engine (ACE) of CISCO SYSTEMS, INC., SAN JOSE, CA. The ACE is a high-performance network stack capable of terminating millions of TCP flows, as well as handling UDP and raw IP flows. The ACE is configured to perform load balancing and application delivery services. It should be understood that the service appliance 106 is not limited to the above example and can be any type of service appliance such as a service appliance configured to perform a load balancing service.

As discussed above, the service appliance 106 can be configured to perform a load balancing service. Load balancing is the process of deciding which server $S_1, S_2 \ldots S_n$ of a server farm 108 is best suited to fulfill a client request. Although there are three servers shown in FIG. 1, it should be understood that the server farm 108 can include any number of servers. For example, the client device 104 can send a request for a webpage or to download a file, and the service appliance 106 can select which of the servers $S_1, S_2 \ldots S_n$ is best suited to fulfill the client request in the shortest amount of time without overloading the selected server and/or the server farm 108. The service appliance 106 can provide the load balancing service with a load balancing algorithm to predict which server $S_1, S_2 \ldots S_n$ is best suited to service the client request. The load balancing algorithm can include, but is not limited to, a round-robin algorithm, a least-connection algorithm based on a number of current connections, a hash address algorithm based on the source and/or destination IP address, a hash cookie algorithm based on a cookie name, a hash header algorithm based on the HTTP header name or a hash URL algorithm based on the requested URL. It should be understood that the load balancing algorithms are not limited to the above examples and can be any algorithm for selecting a server in the server farm 108.

In an example implementation, a request is transmitted from the client device 104. The request can include a packet 120. The packet 120 can include a source address of the client device 104 and a destination address of the service appliance 106. The source and destination addresses of the packet 120 can be included in the packet-header fields, for example. Additionally, the source address of the client device 104 can be an IP address or virtual IP address of the client device 104, and the destination address of the service appliance 106 can be an IP address or virtual IP address of the service appliance 106. After receiving the packet 120 at the packet-forwarding element 102, the packet-forwarding element 102 is configured to make a packet-forwarding decision and transmit the packet 122 to the service appliance 106. The packet 122 includes the source address of the client device 104 and the destination address of the service appliance 106. After receiving the packet 122, the service appliance 106 is configured to perform a load balancing service. As discussed above, the service appliance 106 can determine which of the servers $S_1, S_2 \ldots S_n$ in the server farm 108 is best suited to fulfill the request transmitted by the client device 104. For example, the service appliance 106 can use a load-balancing algorithm to select one of the servers $S_1, S_2 \ldots S_n$ (i.e., server $S_1$).

Upon selecting one of the servers $S_1, S_2 \ldots S_n$ (i.e., server $S_1$), the service appliance 106 is configured to perform implicit network address translation (NAT). Specifically, the service appliance 106 is configured to change the destination address of the packet from the destination address of the service appliance 106 (i.e., the IP address or virtual IP address of the service appliance 106) to a destination address of the selected server $S_1$. The destination address of the selected server $S_1$ can be the IP address or virtual IP address of the server $S_1$, for example. Additionally, the service appliance 106 is optionally not configured to change the source address of the packet. In this case, the source address of the packet remains the same. The service appliance 106 is then configured to transmit the packet 124, which now includes the source address of the client device 104 and the destination address of the selected server $S_1$.

The packet-forwarding element 102 is configured to receive the packet 124, make a packet-forwarding decision and transmit the packet 126 to the selected server $S_1$. The packet 126 includes the source address of the client device 104 and the destination address of the selected server $S_1$. After fulfilling the request of the client device 104, the selected server $S_1$ is configured to transmit a return packet 128. The return packet 128 includes a source address of the selected server $S_1$ and a destination address of the client device 104. For example, the source address of the selected server S1 can be an IP address or virtual IP address of the selected server S1, and the destination address of the client device 104 can be an IP address or virtual IP address of the client device. The packet-forwarding element 102 is configured to receive the return packet 128, make a packet-forwarding decision and transmit the return packet 128 to its destination (i.e., the client device 104).

Figure 6:
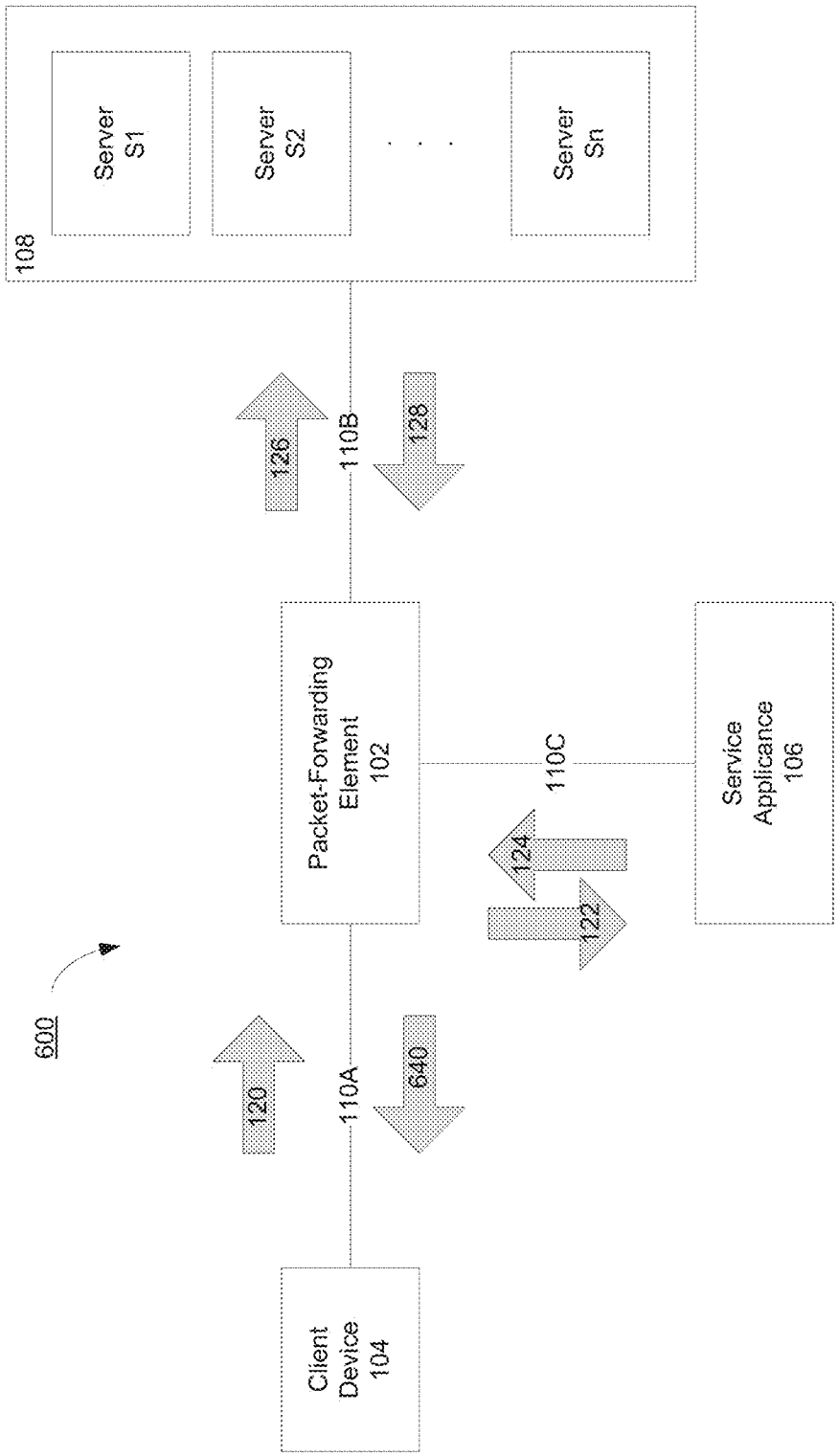
FIG. 6 is a block diagram illustrating a system for forwarding packets in a network.

As discussed above, the request by the client device 104 (i.e., packet 120) includes a destination address of the service appliance 106, and not a destination address of the selected server $S_1$. Additionally, in some implementations, the configuration of the server farm 108 may not be known at the client device 104. Accordingly, if the return packet is transmitted to the client device 104 without passing through the service appliance 106, the return packet may be dropped by the client device 104 because the client device 104 may be unable to associate the return packet with the packet flow. For example, the client device 104 may not be aware that the selected server $S_1$ was the destination. This is shown in FIG. 6, which illustrates a system 600 for forwarding packets in a network is shown. FIG. 6 includes many of the same elements as FIG. 1, and the identical elements are therefore not discussed in detail below. However, as shown in FIG. 6, the packet-forwarding element 102 is configured to receive the return packet 128 transmitted by the selected server $S_1$, make a packet-forwarding decision and transmit the return packet 640. The return packet 640 is transmitted to the client device 104 without passing through the service appliance 106. Because the client device 104 may be unaware of the fact that the selected server $S_1$ serviced the request, the client device 104 may not associate the return packet 640 with the existing flow and/or may drop the return packet 640.

To provide a mechanism for automating return traffic redirection, a control channel can be provided between the service appliance 106 and the packet-forwarding element 102, for example. The control channel can be used to propagate messages 140 having return traffic redirection rules (i.e., a forwarding policy). The control channel can be a port channel including a plurality of network ports bundled together as a logical channel. Alternatively, the control channel can be a port dedicated to propagating the messages 140 having the return traffic redirection rules. For example, the service appliance 106 can boot up with a startup configuration. Then, the service appliance 106 can use its management interface, for example, to establish the control channel. After establishing the control channel, the service appliance 106 can use the management interface to perform an initial handshake with the packet-forwarding element 102.

The control channel can be used to propagate the messages 140. As discussed above, the messages 140 can include rules for automating return traffic redirection to the packet-forwarding element 102. The messages 140 can be out-of-band messages, for example. In other words, the messages 140 can appear to the packet-forwarding element 102 (and the service appliance 106) as separate from the main communication data flowing between the packet-forwarding element 102 and the service appliance 106 (e.g., the packet flows). The messages 140 can therefore be out-of-band control messages that redirect return traffic to the service appliance 106.

For example, the messages 140 can include a forwarding policy that requests the packet-forwarding element 102 to forward predetermined packets to the service appliance 106. The predetermined packets can, for example, include the return packet 128, which flows from the selected server $S_1$ to the client device 104. Additionally, the predetermined packets can include any or all packets flowing from the servers $S_1, S_2 \ldots S_n$ in the server farm 108. The messages 140 can be automatically transmitted to the packet-forwarding element 102 by the service appliance 106. The messages 140 can be automatically transmitted to the packet-forwarding elements for all configured servers $S_1, S_2 \ldots S_n$ in the server farm 108 by the service appliance 106. The messages 140 can be policy-based routing (PBR) rules, for example. The PBR rules provide a mechanism for a network administrator to forward/route packets using predefined policies instead of forwarding/routing packets based on destination addresses of the packets. The PBR rules can define and implement forwarding policies based on other criteria such as any information contained in the packet-header fields. For example, the PBR rules can include one or more criteria for identifying the predetermined packets to forward (or route, reroute direct, redirect, divert, re-divert, etc.) to the service appliance 106. Additionally, the one or more criteria can have corresponding forwarding rules. In some implementations, the one or more criteria can be match clauses, and the corresponding forwarding rules can be set causes. An example match clause is shown below in (1).

(1) match source IP next hop

For example, the match cause shown in (1) is causes the packet-forwarding element 102 to identify predetermined packets (i.e., return packet 128) having a next hop routing address that were passed by one of the servers $S_1, S_2 \ldots S_n$ in the server farm 108. If the match clause shown in (1) is satisfied, the packet-forwarding element 102 is configured to forward the return packets according to the set clause (i.e., to the service appliance 106). In other words, the packet-forwarding element 102 implements a forwarding policy for packets flowing from the servers $S_1, S_2 \ldots S_n$ in the server farm 108. As shown in FIG. 1, the return packet 128 is forwarded to the service appliance 106 by the packet-forwarding element 102. Upon receiving the return packet 130, the service appliance transmits the return packet 132 to the client device 104. The return packet 132 has a source address of the service appliance 106 and a destination address of the client device 104. Accordingly, in contrast to the return packet 640 shown in FIG. 6, the client device 104 can associate the return packet 134 with the existing packet flow because the return packet is redirected to the service appliance 106.

In addition, the packet-forwarding element 102 can be configured to transmit the messages 140 having the return traffic redirection rules to one or more adjacent packet-forwarding elements. Alternatively or additionally, the packet-forwarding element 102 can be configured to notify (i.e., transmit a control message such as messages 140, for example) the service appliance 106 of a change in network configuration. For example, the change in network configuration can result from the addition and/or removal of one or more servers $S_1, S_2 \ldots S_n$ from the server farm 108, addition and/or removal of one or more virtual IP addresses, or any other change in state of the network. After receiving a message from the packet-forwarding element 102 indicating the change in network configuration, the service appliance 106 can be configured to generate an updated forwarding policy that reflects the change in network configuration. The service appliance 106 can then be configured to transmit an updated out-of-band message over the communication channel to the packet-forwarding element 102 with the updated forwarding policy.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 2A:
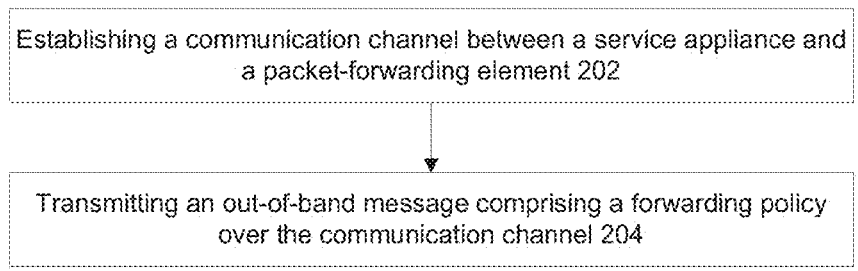
FIGS. 2A-2B are flow diagrams illustrating example operations for automating return traffic redirection implemented by a service appliance.
Figure 3A:
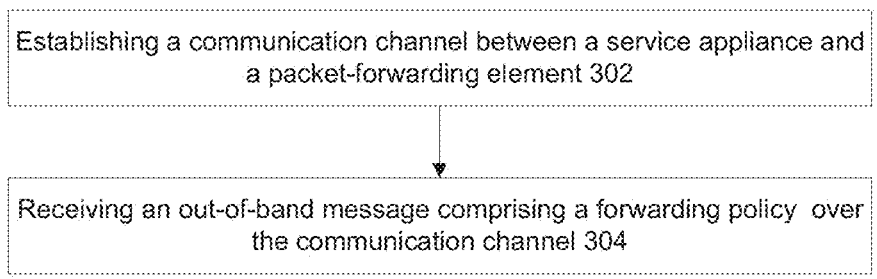
FIGS. 3A-3B are flow diagrams illustrating example operations for automating return traffic redirection implemented by a packet-forwarding element.

Referring now to FIG. 2A, a flow diagram illustrating example operations for automating return traffic redirection is shown. Specifically, at 202, a communication channel is established between a service appliance and a packet-forwarding element. Then, at 204, an out-of-band message including a forwarding policy is transmitted over the communication channel. As discussed above, these example operations can be performed by the service appliance. Additionally, a flow diagram illustrating example operations for automating return traffic redirection is shown in FIG. 3A. At 302, a communication channel is established between a service appliance and a packet-forwarding element. Then, at 304, an out-of-band message including a forwarding policy is received over the communication channel. These example operations can be performed by the packet-forwarding element. According to the above configuration, it is possible to automatically insert return traffic redirection rules into the packet-forwarding element.

Figure 2B:
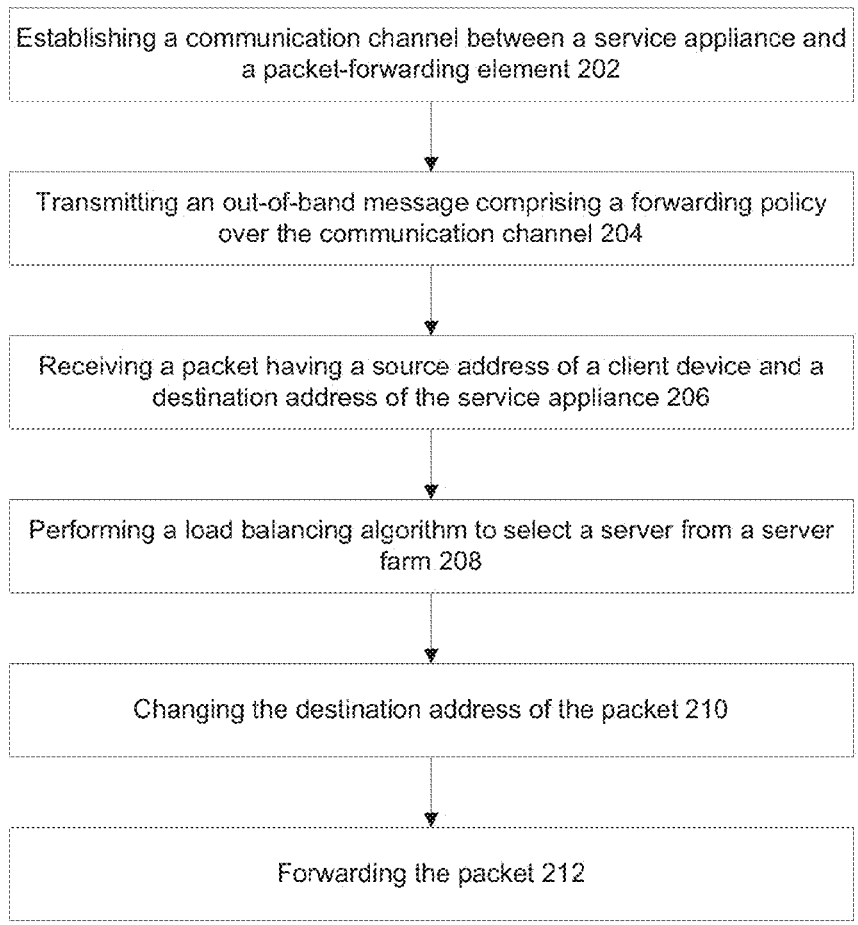

Referring now to FIG. 2B, another flow diagram illustrating example operations for automating return traffic redirection is shown. Similarly to FIG. 2A, a communication channel is established between a service appliance and a packet-forwarding element at 202, and an out-of-band message including a forwarding policy is transmitted over the communication channel at 204. Then, at 206, a packet having a source address of a client device and a destination address of the service appliance is received at 206. At 208, a load-balancing algorithm to select a server from a server farm is performed. After selecting a server, at 210, the destination address of the packet is changed from the destination address of the service appliance to a destination address of the selected server, for example. At 212, the packet is forwarded to its destination (i.e., the selected server). These example operations can be performed by the service appliance, for example. According the above configuration, it is possible to automatically insert return traffic redirection rules into the packet-forwarding element without performing source NAT.

Figure 3B:
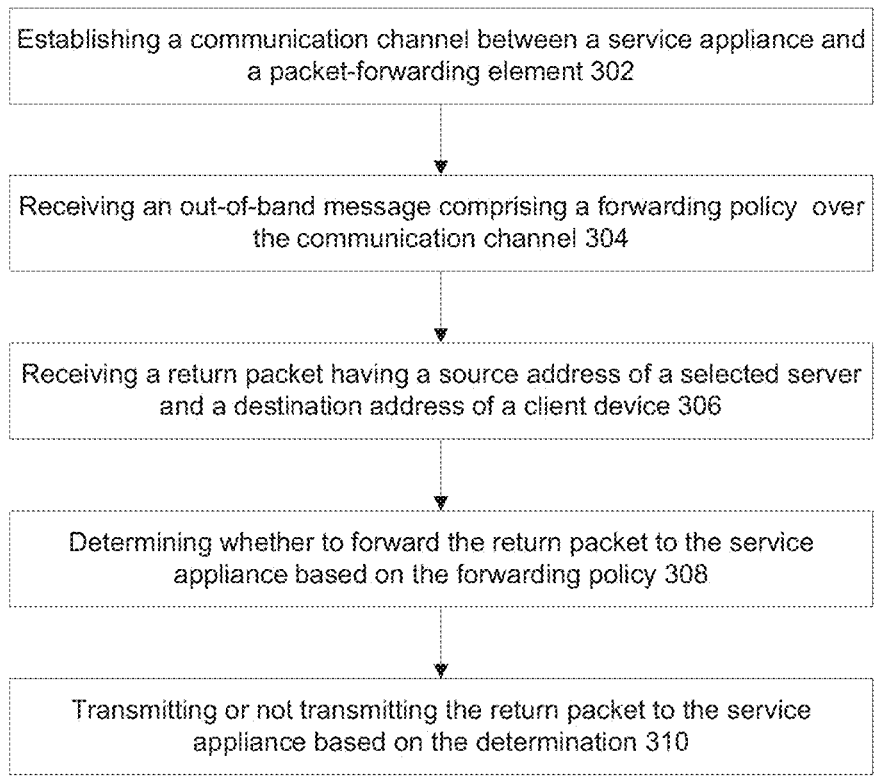

Referring now to FIG. 3B, another flow diagram illustrating example operations for automating return traffic redirection is shown. Similarly to FIG. 3A, a communication channel is established between a service appliance and a packet-forwarding element at 302, and an out-of-band message including a forwarding policy is received over the communication channel at 304. Then, at 306, a return packet having a source address of a selected server and a destination address of a client device is received. At 308, a determination is made as to whether to forward the return packet to the service appliance based on the forwarding policy. Then, at 310, the return packet is transmitted (or not transmitted) to the service appliance based on the determination. These example operations can be performed by the packet-forwarding element, for example. According to the above configuration, it is possible to automatically insert return traffic redirection rules into the packet-forwarding element.

Figure 4:
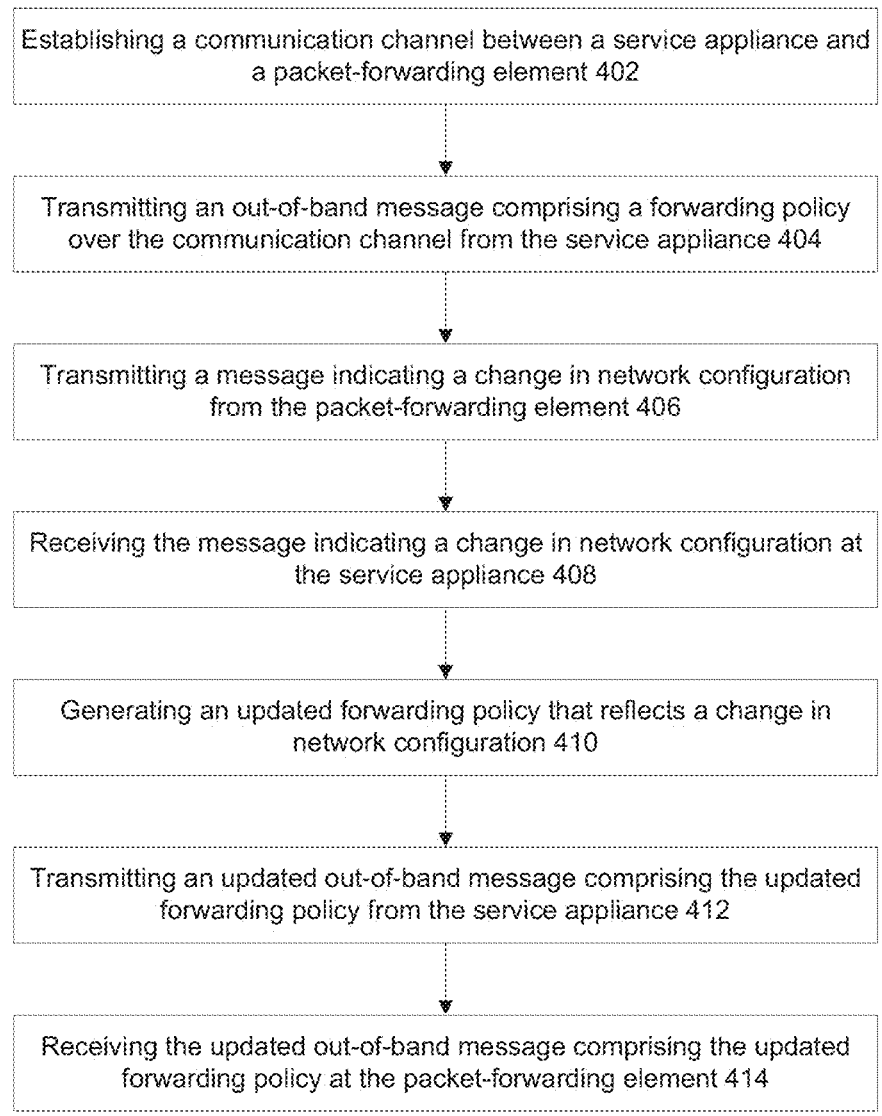
FIG. 4 is a flow diagram illustrating example operations for updating forwarding policies.

Referring now to FIG. 4, a flow diagram illustrating example operations for updating forwarding policies is shown. Similarly to FIGS. 2A-2B and 3A-3B, at 402, a communication channel is established between a service appliance and a packet-forwarding element, and at 404, an out-of-band message including a forwarding policy is transmitted by the service appliance to the packet-forwarding element over the communication channel. Following a change in network configuration, a message is transmitted from the packet-forwarding element to the service appliance at 406. The change in network configuration can result from server mobility, virtual IP address mobility, or any other change in the state of the network. The message indicating a change in network configuration is then received by the service appliance at 408. At 410, an updated forwarding policy that reflects a change in network configuration is generated by the service appliance. The updated out-of-band message including the updated forwarding policy is then transmitted from the service appliance and 412, which is received by the packet-forwarding element at 414. Thus, according to the above configuration, it is possible to automatically insert return traffic redirection rules into the packet-forwarding element following a change in network configuration.

Figure 5:
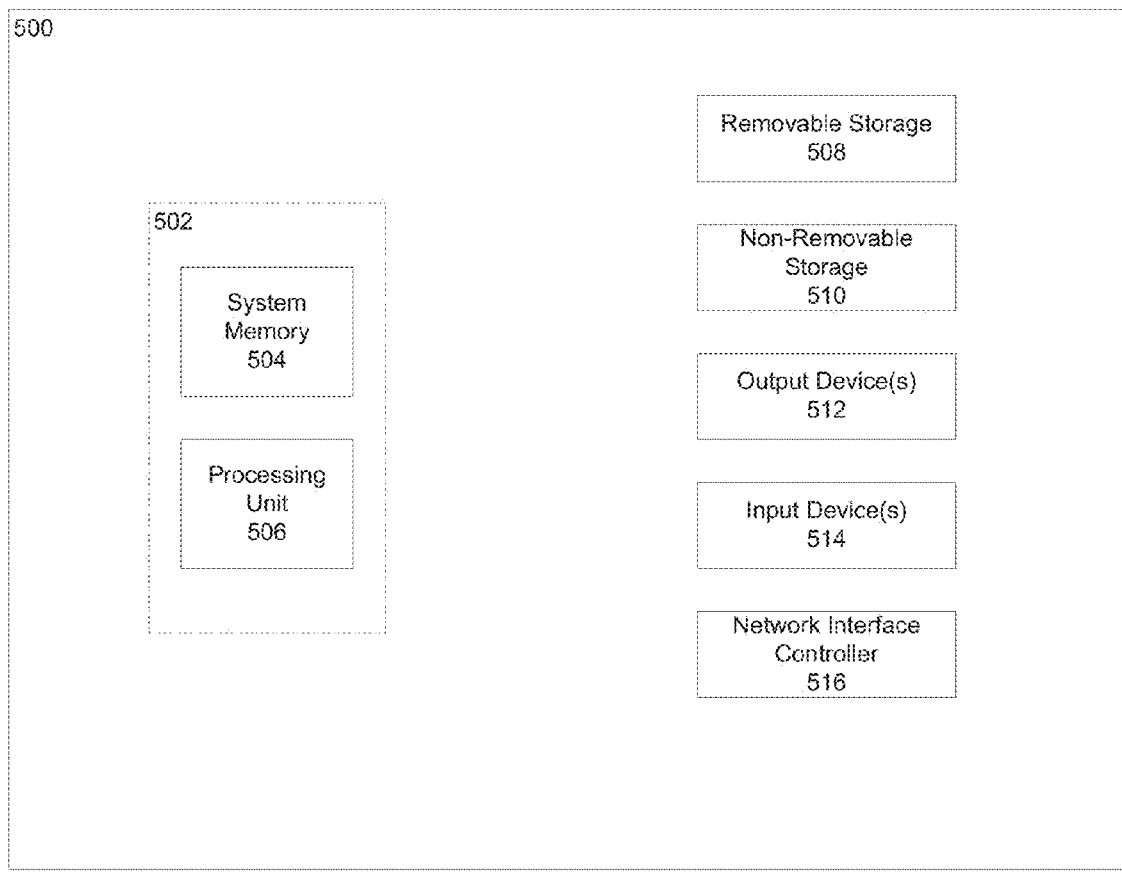
FIG. 5 is an example computing device.

When the logical operations described herein are implemented in software, the process may execute on any type of computing architecture or platform. For example, referring to FIG. 5, an example computing device upon which embodiments of the invention may be implemented is illustrated. In particular, the packet-forwarding element 102, the client device 104, the service appliance 106 and the servers $S_1, S_2 \ldots S_n$ discussed above may be a computing device, such as computing device 500 shown in FIG. 5. The computing device 500 may include a bus or other communication mechanism for communicating information among various components of the computing device 500. In its most basic configuration, computing device 500 typically includes at least one processing unit 506 and system memory 504. Depending on the exact configuration and type of computing device, system memory 504 may be volatile (such as random access memory (RAM)), non-volatile (such as read-only memory (ROM), flash memory, etc.), or some combination of the two. This most basic configuration is illustrated in FIG. 5 by dashed line 502. The processing unit 506 may be a standard programmable processor that performs arithmetic and logic operations necessary for operation of the computing device 500.

Computing device 500 may have additional features/functionality. For example, computing device 500 may include additional storage such as removable storage 508 and non-removable storage 510 including, but not limited to, magnetic or optical disks or tapes. Computing device 500 may also contain network connection(s) 516 that allow the device to communicate with other devices. Computing device 500 may also have input device(s) 514 such as a keyboard, mouse, touch screen, etc. Output device(s) 512 such as a display, speakers, printer, etc. may also be included. The additional devices may be connected to the bus in order to facilitate communication of data among the components of the computing device 500. All these devices are well known in the art and need not be discussed at length here.

The processing unit 506 may be configured to execute program code encoded in tangible, computer-readable media. Computer-readable media refers to any media that is capable of providing data that causes the computing device 500 (i.e., a machine) to operate in a particular fashion. Various computer-readable media may be utilized to provide instructions to the processing unit 506 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 506 may execute program code stored in the system memory 504. For example, the bus may carry data to the system memory 504, from which the processing unit 506 receives and executes instructions. The data received by the system memory 504 may optionally be stored on the removable storage 508 or the non-removable storage 510 before or after execution by the processing unit 506.

Computing device 500 typically includes a variety of computer-readable media. Computer-readable media can be any available media that can be accessed by device 500 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 504, removable storage 508, and non-removable storage 510 are all examples of computer storage media. Computer storage media include, but are not limited to, RAM, ROM, electrically erasable program read-only memory (EE-PROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

There are several advantages to automatically inserting return traffic redirection rules into the packet-forwarding element as discussed herein. For example, it is possible to avoid performing source NAT at the service appliance. As discussed above, source NAT is an undesirable deployment in many types of networks. Thus, the return packets are redirected to the service appliance based on the forwarding policy that is automatically transmitted over the control channel. Additionally, it is possible to avoid manually configuring return traffic redirection rules on the packet-forwarding element and/or the servers. Instead, the return traffic redirection rules are automatically inserted into the packet-forwarding element by the service appliance. Further, it is possible to automatically update the forwarding policy in response to a change in network configuration.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for automating return traffic redirection, the method comprising:
    at a service appliance, establishing a communication channel between the service appliance and a packet-forwarding element;
    at the service appliance, transmitting an out-of-band message over the communication channel to the packet-forwarding element, the message comprising a forwarding policy that requests the packet-forwarding element to forward predetermined packets to the service appliance,
    at the service appliance, receiving a packet having a source address of a client device and a destination address of the service appliance;
    at the service appliance, performing a load balancing algorithm to select a server among one or more servers;
    at the service appliance, changing the destination address of the packet to an address of the selected server;
    at the service appliance, forwarding the packet having the source address of the client device and the destination address of the selected server;
    at the service appliance, receiving a message from the packet-forwarding element indicating a change in network configuration;
    at the service appliance, generating an updated forwarding policy that reflects the change in network configuration; and
    at the service appliance, transmitting an updated out-of-band message over the communication channel to the packet-forwarding element, the message comprising the updated forwarding policy.

2. The method of claim 1, wherein the message is a policy-based routing (PBR) rule.

3. The method of claim 2, wherein the PBR rule comprises one or more criteria and corresponding forwarding rules.

4. The method of claim 3, wherein the one or more criteria and corresponding forwarding rules are based on source addresses of the predetermined packets.

5. The method of claim 1, wherein the communication channel is a port channel.

6. The method of claim 1, wherein the service appliance is configured to perform a load-balancing service.

7. A method for automating return traffic redirection, the method comprising:
    at a packet-forwarding element, establishing a communication channel between a service appliance and the packet-forwarding element;
    at the packet-forwarding element, receiving an out-of-band message over the communication channel from the service appliance, the message comprising a forwarding policy that requests the packet-forwarding element to forward predetermined packets to the service appliance,
    at the packet-forwarding element, receiving a return packet having a source address of a server and a destination address of a client device;
    at the packet-forwarding element, determining whether to forward the return packet to the service appliance based on the forwarding policy; and
    at the packet-forwarding element, transmitting or not transmitting the return packet to the service appliance based on the determination.

8. The method of claim 7, wherein the message is a policy-based routing (PBR) rule.

9. The method of claim 8, wherein the PBR rule comprises one or more criteria and corresponding forwarding rules.

10. The method of claim 9, wherein the one or more criteria and corresponding forwarding rules are based on source addresses of the predetermined packets.

11. The method of claim 7, wherein the communication channel is a port channel.

12. A method for automating return traffic redirection, the method comprising:
- at a packet-forwarding element, establishing a communication channel between a service appliance and the packet-forwarding element;
- at the packet-forwarding element, receiving an out-of-band message over the communication channel from the service appliance, the message comprising a forwarding policy that requests the packet-forwarding element to forward predetermined packets to the service appliance,
- at the packet-forwarding element, transmitting a message to the service appliance indicating a change in network configuration; and
- at the packet-forwarding element, receiving an updated out-of-band message over the communication channel from the service appliance, the message comprising an updated forwarding policy that reflects the change in network configuration.

13. A method for automating return traffic redirection, the method comprising:
- at a packet-forwarding element, establishing a communication channel between a service appliance and the packet-forwarding element;
- at the packet-forwarding element, receiving an out-of-band message over the communication channel from the service appliance, the message comprising a forwarding policy that requests the packet-forwarding element to forward predetermined packets to the service appliance; and
- at the packet-forwarding element, transmitting the out-of-band message to one or more adjacent packet-forwarding elements.

14. A non-transitory computer-readable recording medium for automating return traffic redirection having computer-executable instructions stored thereon that, when executed by a service appliance, cause the service appliance to:
- establish a communication channel between the service appliance and a packet-forwarding element; and
- transmit an out-of-band message over the communication channel to the packet-forwarding element, the message comprising a forwarding policy that requests the packet-forwarding element to forward predetermined packets to the service appliance, and having further computer-executable instructions stored thereon that, when executed by the packet-forwarding element, cause the packet-forwarding element to:
- receive the out-of-band message over the communication channel from the service appliance;
- receive a return packet having a source address of a server and a destination address of a client device;
- determine whether to forward the return packet to the service appliance based on the forwarding policy; and
- transmit or not transmit the return packet to the service appliance based on the determination.

15. The non-transitory computer-readable recording medium of claim 14, wherein the message is a policy-based routing (PBR) rule.

16. The non-transitory computer-readable recording medium of claim 15, wherein the PBR rule comprises one or more criteria and corresponding forwarding rules.

17. The non-transitory computer-readable recording medium of claim 16, wherein the one or more criteria and corresponding forwarding rules are based on source addresses of the predetermined packets.

\* \* \* \* \*